United States Patent [19]
Hoyt et al.

[11] 3,942,270
[45] Mar. 9, 1976

[54] SIMULATION OF VISUAL BLACKOUT DUE TO AIRCRAFT MANEUVERING

[75] Inventors: Carl E. Hoyt, Vestal; Timothy E. Hale, Kirkwood, both of N.Y.

[73] Assignee: The Singer Company, New York, N.Y.

[22] Filed: Aug. 5, 1974

[21] Appl. No.: 494,871

[52] U.S. Cl. .................. 35/12 N; 350/160 LC; 2/6
[51] Int. Cl.² ........................................... G09B 9/08
[58] Field of Search .... 35/12 N, 12 G; 350/160 LC; 2/6, 15

[56] References Cited
UNITED STATES PATENTS

| | | | |
|---|---|---|---|
| 3,675,344 | 7/1972 | Williams | 35/12 N |
| 3,675,988 | 7/1972 | Soref | 350/160 LC |
| 3,741,629 | 6/1973 | Kahn | 350/160 LC |
| 3,772,874 | 11/1973 | Lefkowitz | 350/160 LC X |

*Primary Examiner*—Edward S. Bauer
*Attorney, Agent, or Firm*—James F. Duffy; James C. Kesterson

[57] ABSTRACT

A means of simulating loss of peripheral vision and the eventual total black-out experienced by a pilot, undergoing high acceleration forces while maneuvering an aircraft is disclosed. The simulation is achieved by modifying the pilot's helmet by incorporating thereon a variable optical device which when excited causes a reduction of pilot vision. The reduction in vision is progressive, in direct proportion to the level of excitation applied, which excitation itself is directly proportional to the acceleration forces simulated.

42 Claims, 13 Drawing Figures

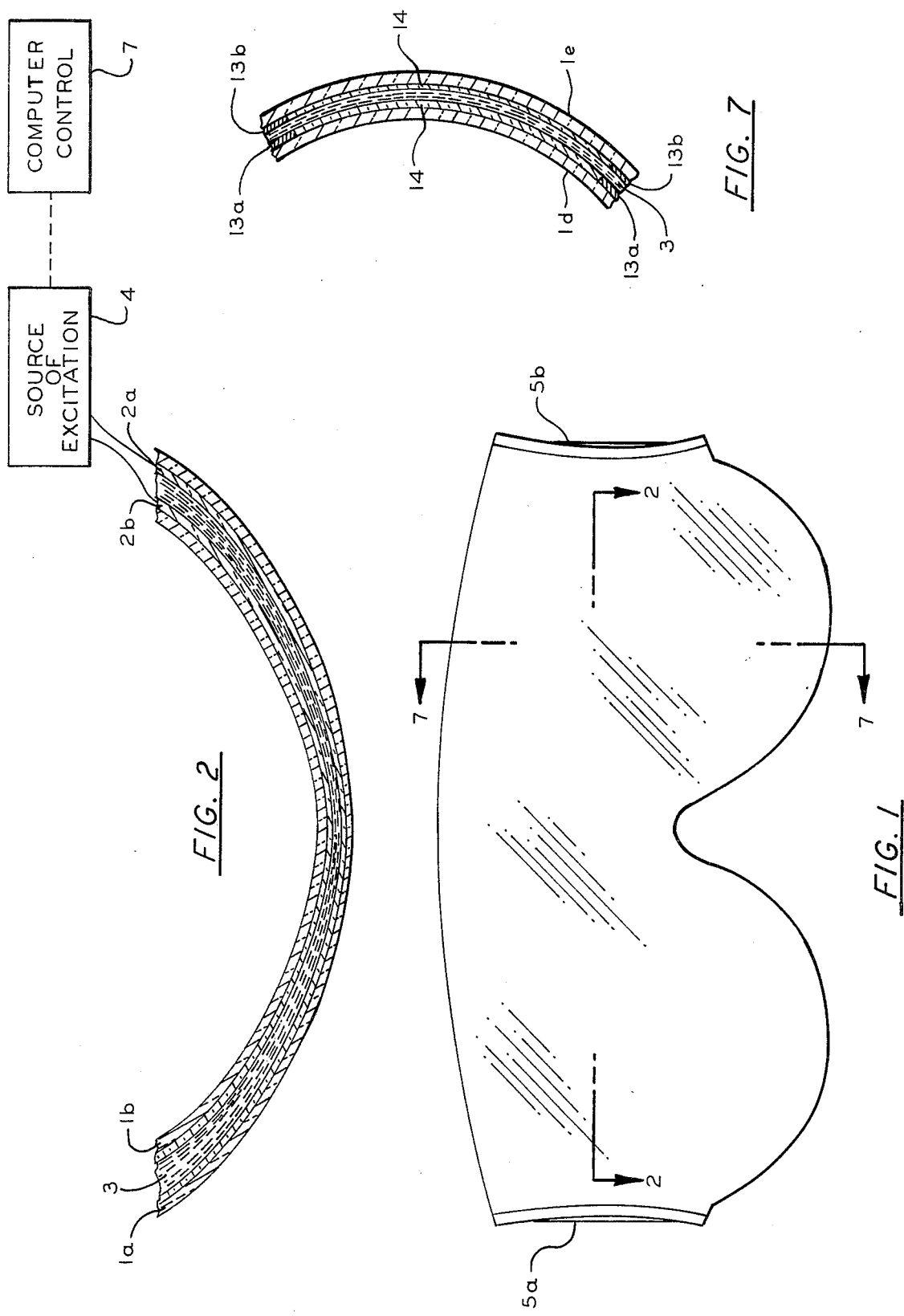

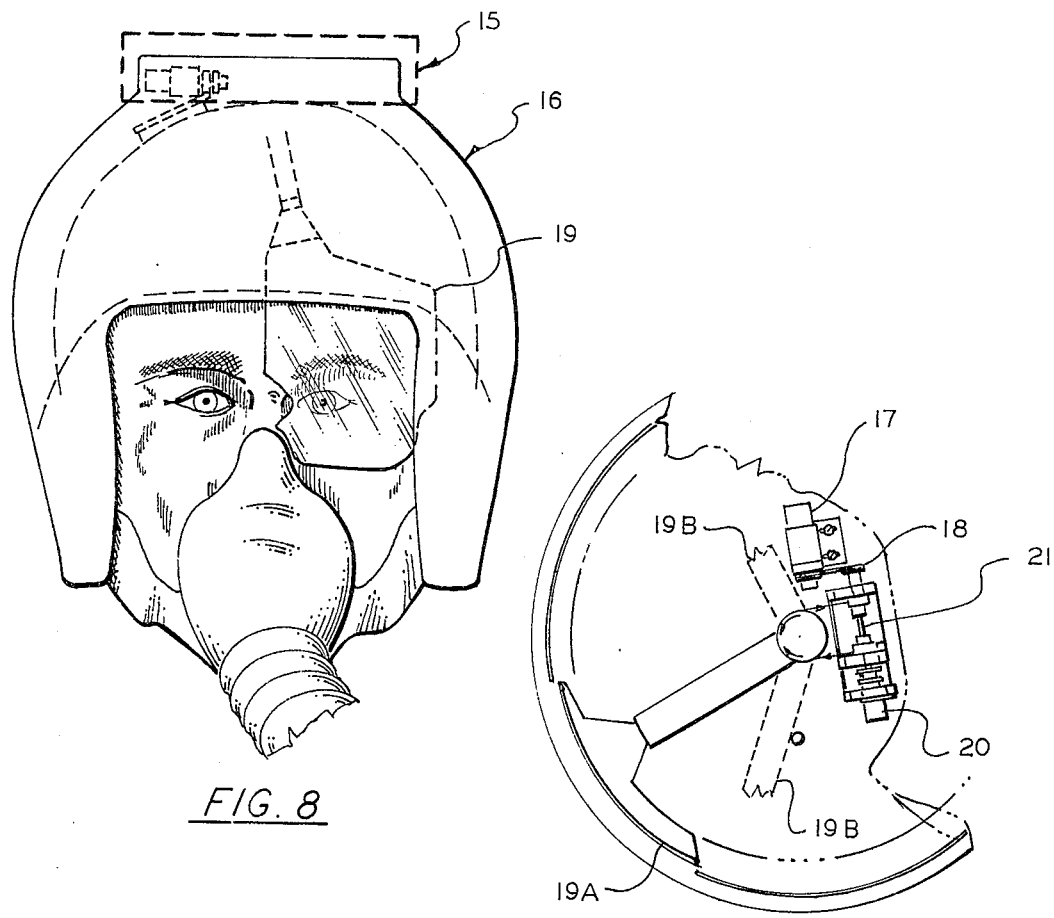
FIG. 8
FIG. 9
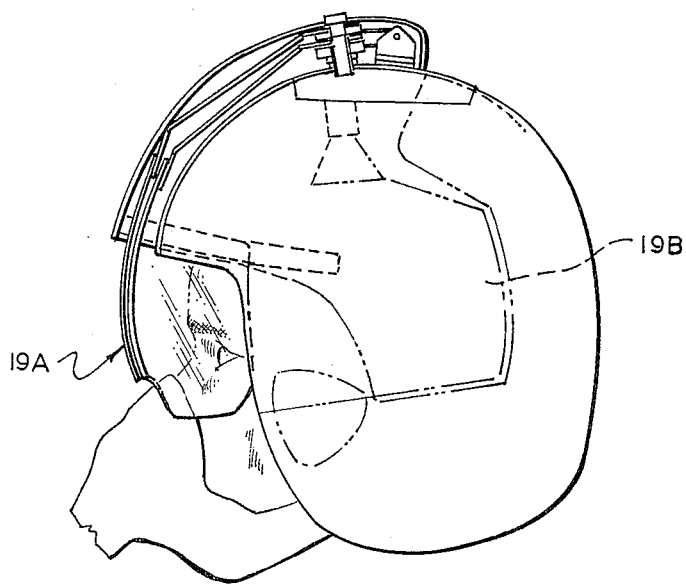
FIG. 10

SIMULATION OF VISUAL BLACKOUT DUE TO AIRCRAFT MANEUVERING

BACKGROUND OF THE INVENTION

The invention herein described was made in the course of or under a contract, or subcontract thereunder, with the Department of the Air Force.

The cost of today's aircraft and their complexity make it almost mandatory that simulator devices be employed in training pilots to be certain that the training presented is as broad as possible while limiting risks of damage to public, to crew and to the aircraft itself. An effective flight simulator will, to the greatest extent possible, surround the pilot-trainee with the sights, sounds, and motions associated with the actual aircraft such that he will tend to forget the fact that he is in a trainer and he will react as he would in actual flight.

In flight under high-g acceleration stresses a pilot may black-out and then lose consciousness. Part of the physiological process of blacking-out is to experience tunnel vision. An experienced pilot learns to judge how close he is to black-out by the extent of his peripheral vision loss.

Prior attempts to simulate pilot's loss of peripheral vision during high-g-simulated maneuvers have assumed that the pilot would be continually looking in some preferred direction. The view of the simulated outside world presented to the pilot was darkened beginning at the periphery of his assumed visual aspect. Since the pilot could move his head, the cone of clear vision did not remain before him. In addition, as the outside view darkened the pilot's normal reaction was to shift to instrument flight. The prior methods of simulating loss of peripheral vision were totally unsatisfactory as either a realistic simulation of the physiological reaction or as a technique for limiting the pilot trainee's ability to function.

SUMMARY OF THE INVENTION

This invention provides the means for obtaining a regular, progressive change in a pilot's field of vision by systematically occulting his line of sight as he manipulates the controls of a simulated vehicle, maneuvering the simulated craft through regions of high simulated g-stresses.

One embodiment of this invention affects the transmission characteristics of variable optical media (VOM) by establishing a gradient in the excitation applied across the VOM or by providing a graded variation in the thickness of the VOM.

Another embodiment decreases the pilot's field of vision by interposing from either side of his line of sight, a shaded visor having a graded variation in density.

Often a computer or a mechanically programmed selection matrix is provided as a means of controlling the magnitude and application situs of excitation to the VOM or for controlling the depth of penetration of each visor into the pilot's vision field.

The techniques here disclosed for VOM devices may be employed to affect visual stimulation which may be further enhanced by choice of the shape, size and location of the electrodes selected. In addition these techniques do not limit the VOM to devices having flat planar surfaces but may be employed with complex shapes, such as the curved visor of a pilot's helmet, as well.

Therefore, it is an object of this invention to provide a training device whereby a standard flight helmet is modified so as to simulate the on-set of progressive tunnel vision as experienced by a pilot undergoing high acceleration forces.

It is another object of this invention to overcome the shortcomings of the prior art by simulating the psysiological process of progressive peripheral vision loss to a degree never before achieved.

Further objectives for use of the invention in controlling light intensity, data display and eye stimulation, will be apparent upon reading the description of the preferred embodiments.

BRIEF DESCRIPTION OF THE DRAWINGS

FIG. 1 illustrates the visor of a pilot's standard flight helmet.

FIG. 2 is a cross section of the helmet visor showing a thickness gradient of the VOM layer.

FIG. 7 is a cross section of the helmet visor modified to produce a distributed voltage gradient by use of combination electrodes.

FIG. 8 illustrates the standard flight helmet modified with blackout visors and protective fiberglass cover.

FIG. 9 is a top view of the helmet of FIG. 8.

FIG. 10 is a side view of the helmet of FIG. 8.

DESCRIPTION OF THE PREFERRED EMBODIMENT

Figure 3:
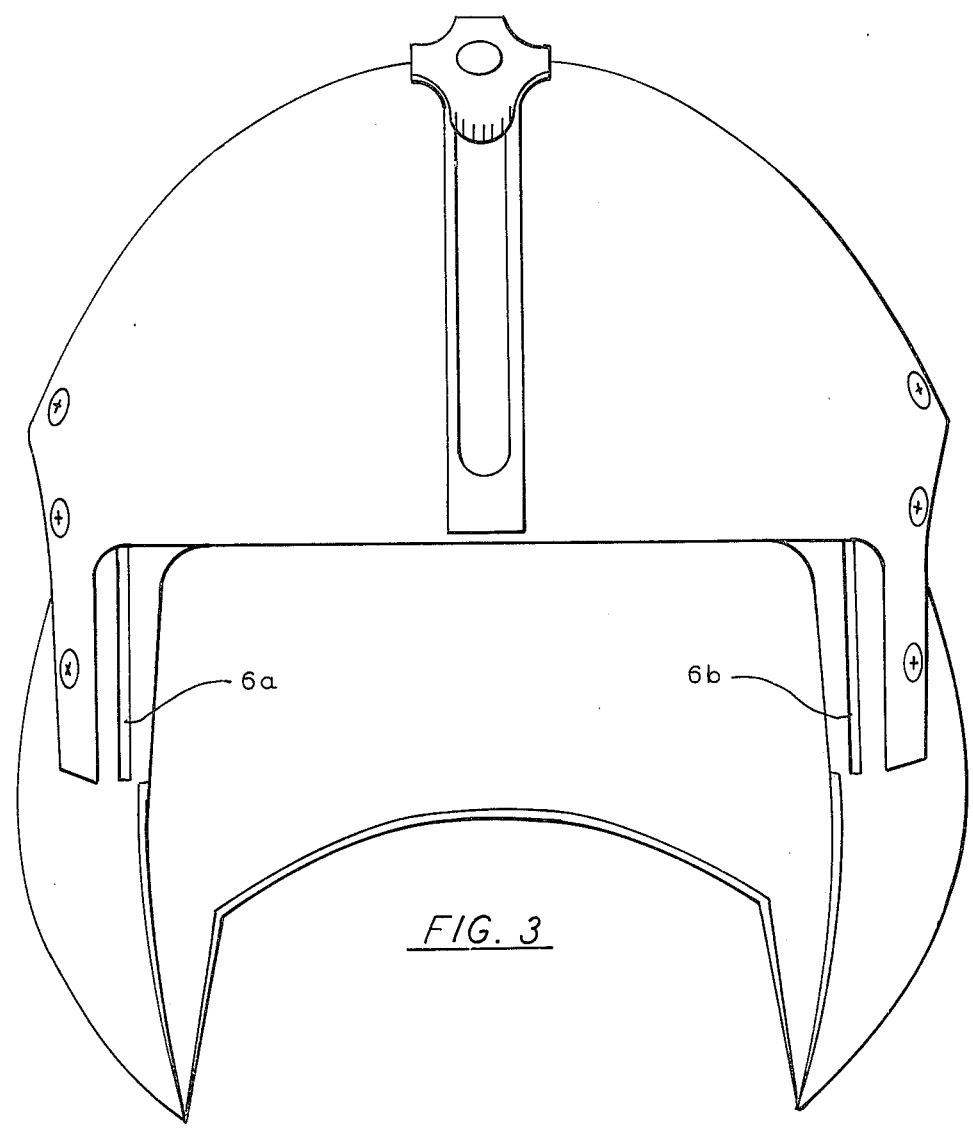
FIG. 3 shows a standard flight helmet.

Variable optical media (VOM) such as liquid crystals and electrooptic material have been used in the past to obtain color changes or to affect the transmission or reflection of light. Liquid crystals are known to react to various forms of excitation such as electrical, mechanical, thermal, magnetic, etc. Electro-optic materials react to a voltage applied across them. When excited, the optical transmission characteristics of VOM devices are affected.

The VOM in the embodiments of the invention herein disclosed will be a liquid crystal whose optical transmission characteristic is caused to vary from transparent-clear to diffuse-opaque upon application of a voltage means of excitation. The invention however is not limited to using liquid crystals as the VOM but various optical media may be employed and the transmission characteristic of the medium used may vary from diffuse-opaque to transparent-clear; from colorless to colored; from reflecting to transmitting or transmitting to reflecting; from polarized to non-polarized or vice versa upon application of suitable means for exciting the desired variation in the particular VOM chosen, regardless of whether the means required to excite that particular medium be electrical, mechanical, thermal, light, magnetic or other form of excitation.

Uniformity of change in optical transmission qualities is characteristic of VOM devices constructed in accord with prior art in which each element of the device lies in a plane parallel to that in which each other element lies such that the VOM layer has a uniform cross section. When a voltage is applied across a VOM layer of non-varying thickness its optical transmission characteristic is affected uniformly, the degree of change being relative to the level of excitation (typically 10v to 60v, ac or dc). However, as taught in accordance with one embodiment of this invention, the VOM is not of uniform thickness, as advocated by such prior art, but has a predetermined variation in thickness, typical thickness values being ½ to 5 mils.

This departure from a sandwich construction of parallel planar elements causes the VOM to change its transmission qualities in a *non-uniform* manner upon application of a voltage across the VOM layer. As the level of excitation is increased, the change in the optical transmission characteristic of the VOM occurs first in the thicker portion of the VOM layer. This change, say from transparent-clear to diffuse-white, moves in a regular, progressive manner from the thicker to the thinner portions of the leyer as the level of excitation is further increased. The ability to have a progressive change in the optical transmission character of the VOM chosen lends itself to construction of devices having apparent movement such as light shutters; windows which may be darkened progressively from, for example, top to bottom as one would draw a shade; and moving displays for the display of varying data, for example, a bar graph, or for visual stimulation of the viewer.

Being able to achieve a progressive change in optical characteristics coupled with the fact that the teachings of this disclosure are not restricted to devices made up of elements having planar surfaces make possible the construction of the embodiment of the invention hereinafter described. Since the surfaces of the devices involved may be curved so that light impinging from one or more given directions is first affected by the variation in the optical transmission characteristic of the VOM, the present teachings may be applied so as to modify a visor of a pilot's flight helmet so that the wearer of that visor can be made to experience the simulated effect of the onset of progressive tunnel vision.

FIGS. 1 and 2 illustrate this latter concept. The standard pilot's flight helmet, FIG. 3, accepts a visor similar to that depicted in FIG. 1. The visor illustrated is here modified, as shown in FIG. 2 in accordance with this invention. Transparent retaining plates 1a and 1b are formed with curved surfaces which are similar to those of an unmodified visor. Conductive transparent electrodes 2a and 2b, for example, gold or tin oxide, are deposited on the inner surfaces of 1a and 1b respectively. The surfaces are curved in a manner which allows a gap to remain between retaining plates 1a and 1b when the visor is assembled. The gap varies from approximately ½ mil at the central portion of the modified visor assembly to approximately 5 mils at the peripheral edges. This void is filled with a VOM 3, for example, a nematic liquid crystal such as p-methoxybenylidine-p-n-butylaniline. When a voltage is applied from source of excitation 4 the transparent-clear liquid crystal becomes diffuse-white first at the edges of the visor. As the excitation is increased, the area of diffusion grows progressively from the edges of the visor toward the central portion. The effect upon a pilot wearing this visor is that his peripheral vision is reduced in a regular, progressive manner as the excitation of the variable optical medium is increased.

The modified visor is provided with visor-guides 5a and 5b which are accepted by the visor cover tracks 6a and 6b of a standard flight helmet as shown in FIG. 3. The visor is thus adaptable for use with a pilot's own personal helmet. The pilot is little aware of any change from the helmet and visor combination he normally utilizes.

Figure 4:
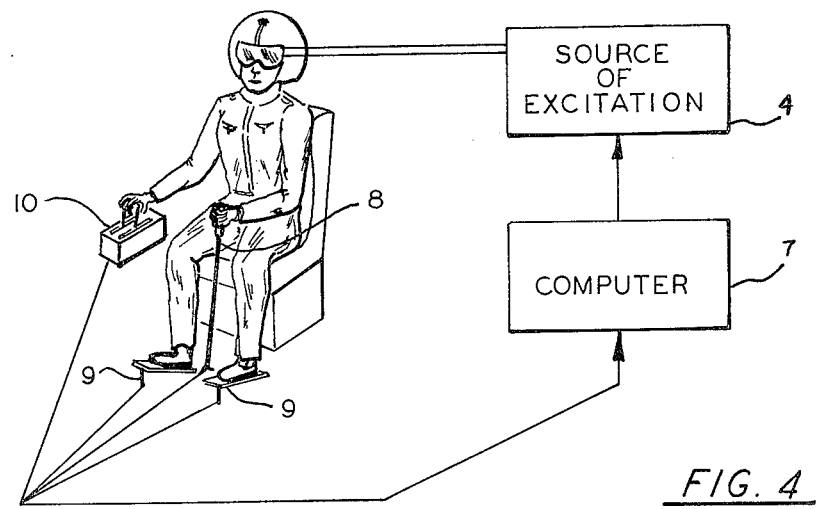
FIG. 4 illustrates the visor modified as a training device in a flight simulator.

When the visor, as modified, is used in conjunction with an aircraft simulator training device, and the source of excitation 4 is susceptable to computer control 7, as indicated in FIG. 4, the reduction in pilot's peripheral vision can be made a function of the simulated flight acceleration loads as dictated by the computer in response to the pilot's control of the simulator stick 8, rudder peddles 9 and throttle 10. Thus, if the "pilot" of the simulator maintains or increases the acceleration factors, his vision can be reduced to the point of black-out. As in actual flight under high-g stresses, the "pilot" of the simulator learns to control his maneuvers by the degree of reduction in his peripheral vision. The modified visor becomes a valuable element in pilot training since there are no distracting contrivances to interfere with the pilot-trainee's psychological involvement with the simulator aircraft.

A gradient to achieve a regular, progressive variation of change in the optical transmission characteristic of the VOM chosen may also be obtained in other ways. Just as a gradation of thickness in the VOM layer led to a progressive change of optical characteristics, so too may a voltage gradient be utilized across a VOM consisting of electro-optical material or voltage activated liquid crystal to achieve the same result. Again, if the VOM is susceptable to other means of excitation, a gradient in the level of that particular excitation, as applied across the VOM, will result in a progressive change in the optical characteristics of the VOM selected.

Figure 5:
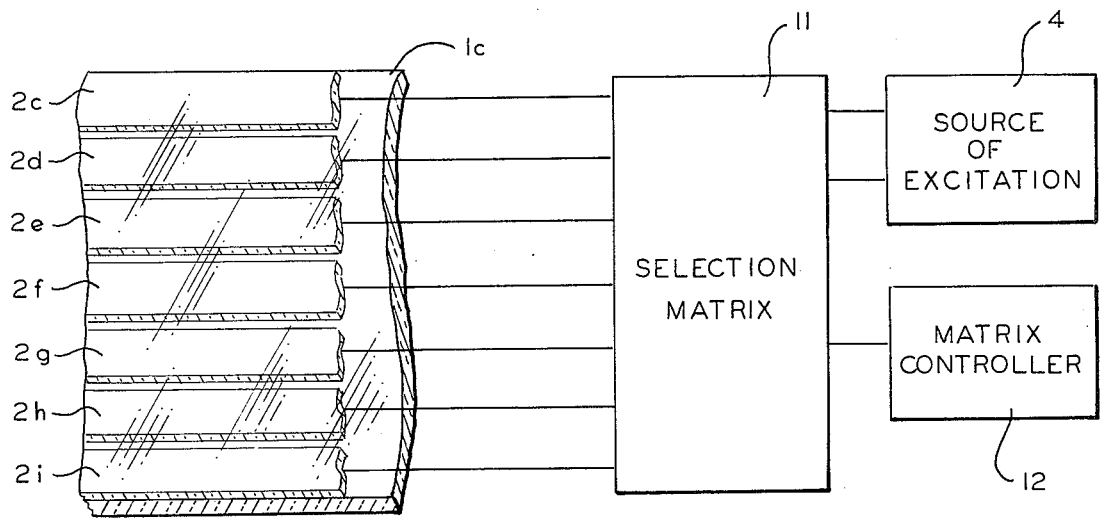
FIG. 5 indicates a method of achieving a gradient in the excitation voltage applied across the VOM layer using discrete electrodes.

FIG. 5 illustrates one method of obtaining a voltage gradient across the VOM. For simplicity only one retaining plate and its associated deposited transparent electrode are shown. The transparent retaining plate 1c has a transparent conducting surface 2 deposited upon it. This conducting surface is then selectively removed, for example, by photo etching, or the like, to provide several independent electrodes: for example 2c through 2i inclusive. The actual configuration of the electrodes will vary as the purpose of the device requires. Each of the electrodes is connected through selection matrix 11 to source of excitation 4. The selection matrix 11 is connected to matrix controller 12 by which means the sequence in which each electrode 2c–2i is energized is selected.

Assume for illustration purposes that the VOM chosen is a nematic liquid crystal of the type already indicated whose optical characteristics change when a voltage is impressed across it. By sequentially applying a voltage first to electrode 2c then to each electrode in turn until electrode 2i is energized the change in the optical characteristic of the liquid crystal will be progressive from top to bottom of the figure illustrated. By energizing electrodes 2c and 2i simultaneously, and then in sequence energizing electrode pairs 2d and 2h, 2e and 2g, then finally electrode 2f, the change in the crystal characteristics will proceed simultaneously from both top and bottom edges toward the center of the figure illustrated. As may be readily seen this technique lends itself directly to the modification of a pilot's flight helmet visor as before mentioned. In this instance however, the VOM layer of FIG. 2 is uniform of thickness and the transparent electrodes consist of multiple independent electrodes energized by source 4 through selection matrix 11 which in turn is controlled by computer 7 as previously taught in FIG. 5.

Figure 6:
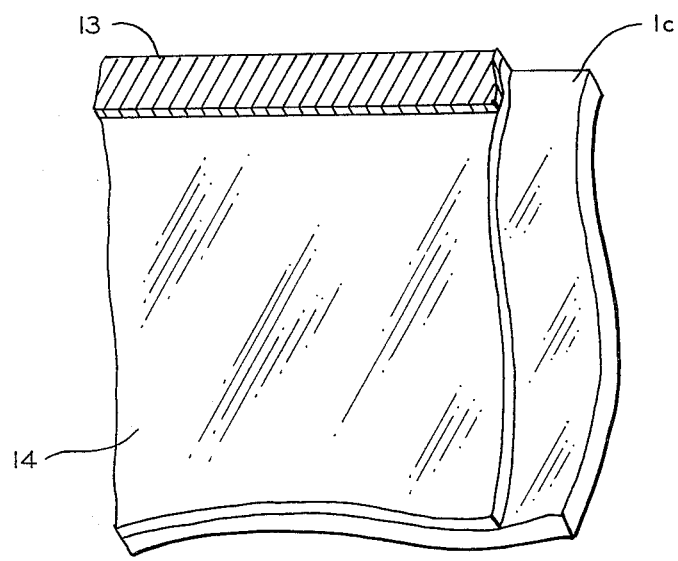
FIG. 6 illustrates the use of combination electrodes to produce a distributed voltage gradient across the VOM layer.

A voltage gradient may be created in a more distributed fashion than by use of multiple discrete electrodes as just illustrated. For ease of illustration, FIG. 6 shows only the combination of electrodes required on each retaining plate to obtain a voltage gradient across the VOM. In FIG. 6 the electrode indicated as 13 consists of material of high conductivity, such as copper, while the transparent electrode 14 consists of a high resistivity material. Tin oxide lends itself to the latter purpose since it may be deposited so as to yield resistances of from a few ohms to several thousand ohms per square.

When a voltage is applied to electrode 13 of FIG. 6 and its complimentary electrode on the opposing retaining plate, a voltage gradient is established across the VOM layer which decreases in amplitude as a function of the resistivity of the transparent electrode and the distance from electrode 13. Thus if, as before, the VOM chosen is a nematic liquid crystal, the crystal will begin to become diffuse-white in the immediate vicinity of electrode 13 when voltage excitation is first provided. Increasing the level of that excitation will cause the area of diffusion to progress throughout the VOM layer.

FIG. 7 illustrates the application of distributed voltage gradient excitation to the visor of the standard Pilot's helmet shown in FIG. 1. In this embodiment the transparent retaining plates 1d and 1e again conform to the complex curvature of the standard visor and again the thickness of the VOM 3 is uniform throughout the device. High resistivity, transparent electrodes 14 are deposited over the inner surfaces of the visor plates while high conductivity electrodes 13a and 13b are located at the edges. Applying a voltage across electrodes 13a and 13b establishes a gradient of voltage across VOM layer 3 which decreases in magnitude as the central area of the layer is approached. Again, if the VOM selected is a nematic crystal, application of voltage across electrodes 13a and 13b will cause the VOM to become diffuse-white first in the immediate vicinity of these electrodes. As the magnitude of the applied voltage is increased, the area of diffusion increases in size, progressing toward the central area of the visor. In this manner the on-set of tunnel vision may be simulated for a pilot trainee using an aircraft simulator trainer, as heretofore described.

Kahn, in U.S. Pat. No. 3,741,629 issued June 26, 1973, discussed "Electronically Variable Iris or Stop Mechanisms" wherein,". . . (o)ne of the electrodes comprises a high resistivity transparent section bounded by a low resistivity annular section." He discloses the use of planar electrodes and his combination low and high resistivity sections of each combination electrode are coplanar as well. The invention herein described is not limited to planar devices but, as taught herein, may be used with complex curved surfaces, nor is the present invention limited to voltage gradients that have a radial distribution as Kahn's specification seems to be.

As is well known to those versed in the art, the VOM materials selected may react adversely with the electrodes deposited on the retaining plates. For this reason it is standard practice to deposit a thin dielectric layer between the electrodes and the VOM to prevent actual contact of these surfaces. Because the use of such a dielectric layer is known to the prior art, it has not been illustrated, for the sake of simplicity, in any of the figures used herein.

The present teaching may also be applied so as to modify a pilot's flight helmet so that the wearer of the helmet can be made to experience the simulated effect of the onset of progressive tunnel vision and black-out due to the imposition of shaded visors into his field of view.

The general arrangement is shown in FIGS. 8, 9 and 10. The visors are stowed at the helmet's sides when the simulated flight condition would call for no reduction of peripheral vision. As the simulated aircraft load factor approaches the tunnel vision/black-out boundary, a motor mounted on top of the helmet moves the visors from the stowed position. The visors progressively cover more of the pilot's face as he increases the load factor.

FIG. 8 is a full front view of the modified helmet showing the concept of how the helmet is worn and the technique of positioning the visor in the wearer's field of vision. The drive mechanism 15 is maintained on top of the standard helmet. The mechanism is protected with a fiberglass cover 16. The maximum outside dimensions of fiberglass cover 16 are approximately the same as that of the standard helmet except for two corners which will be slightly outside the standard contour of the unmodified helmet.

FIG. 9 is a top section of the modified helmet showing in greater detail the drive mechanism 15 which consists of DC motor 17 and "O" ring slip clutch 18. Indicated also in FIG. 9 are the active and the stowed positions of the visor 19A and 19B respectively. In the stowed position 19B the visor is drawn to the side of the helmet and is out of the pilot's field of vision. In the active position 19A it moves forward and into his field of vision. FIG. 10 is a side view of the modified helmet and indicates the stowed position 19B of the visor in a manner easier to conceptualize than was shown in FIG. 9.

If the unmodified helmet, FIG. 3, is equipped with a standard visor and visor cover, these are removed and replaced with the blackout visor mechanism 15. The blackout visors are driven by DC motor 17 which is capable of closing the visors 19 in less than three seconds. DC motor 17 transmits torque to a chain drive through "O" ring slip clutch 18. The clutch slips if the visor is jammed. For instance, the clutch will slip before injuring the pilot if he has his hand on his forehead when the visors are trying to close. A follow-up potentiometer 20 is mounted on chain sprocket shaft 21 to provide a visor-position-signal to a control system such as a computer. If a computer is used the computer program contains the motion profile of the aircraft being simulated and generates a visor-position-command as a function of the simulated aircraft load factor. This visor-position-command causes drive motor 17 to move the visors 19 until they reach a position analogous to the degree of vision reduction expected with the particular simulated aircraft load factor. At that point the visor-position-signal instructs the computer to cut off the visor drive and visor motion ceases.

Available data indicate that pilot blackout tolerance levels vary from pilot to pilot. This tolerance level is included as a variable in the computer program and is adjustable from an instructor's console in the aircraft simulator.

Figure 11:
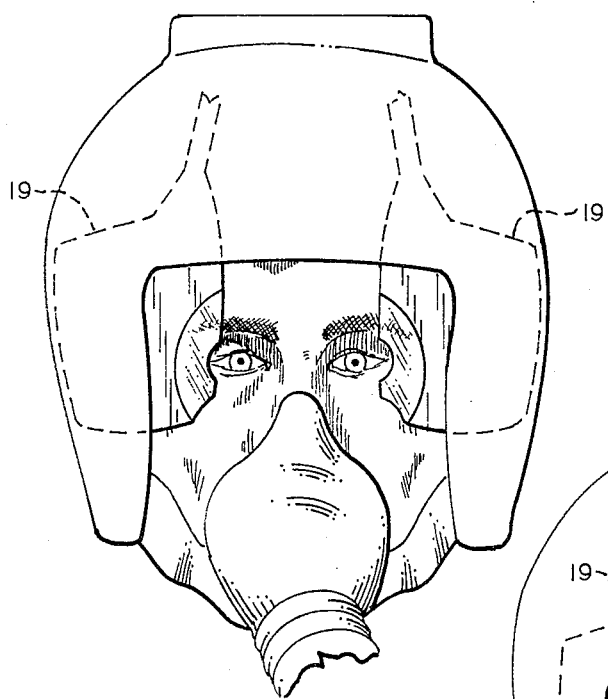
FIG. 11 illustrates the visor positions at the on-set of tunnel vision simulation.
Figure 12:
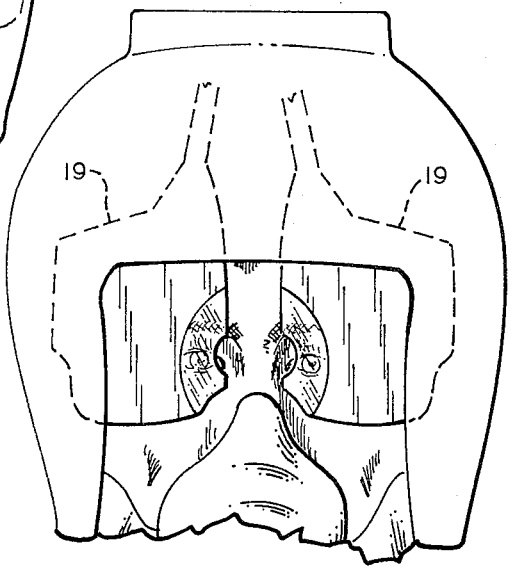
FIG. 12 indicates the visor position as simulated black-out is approached.

FIGS. 11 and 12 indicate the operation of the visors in simulating tunnel vision/blackout. The visor has a cut back and a tinted area the exact shape of which are determined empirically after conferring with pilots who have experienced blackout under high acceleration stress conditions. FIG. 11 indicates that position under which the onset of tunnel vision has occurred. Here, the pilot's field of vision is somewhat constricted by visors 19. In FIG. 12, having experienced the onset of tunnel vision shown in FIG. 11, the pilot, by continuing to handle his simulated aircraft under sustained or increasing simulated high-g stress conditions, has progressed from the initial onset of tunnel vision to the point at which his vision is not only restricted but the amount of light reaching his eyes is also reduced by the tinting of visors 19. If he continues to maintain the controls of the aircraft trainer so as to further experience such high-g simulated forces visors 19 will completely black-out his vision.

Figure 13:
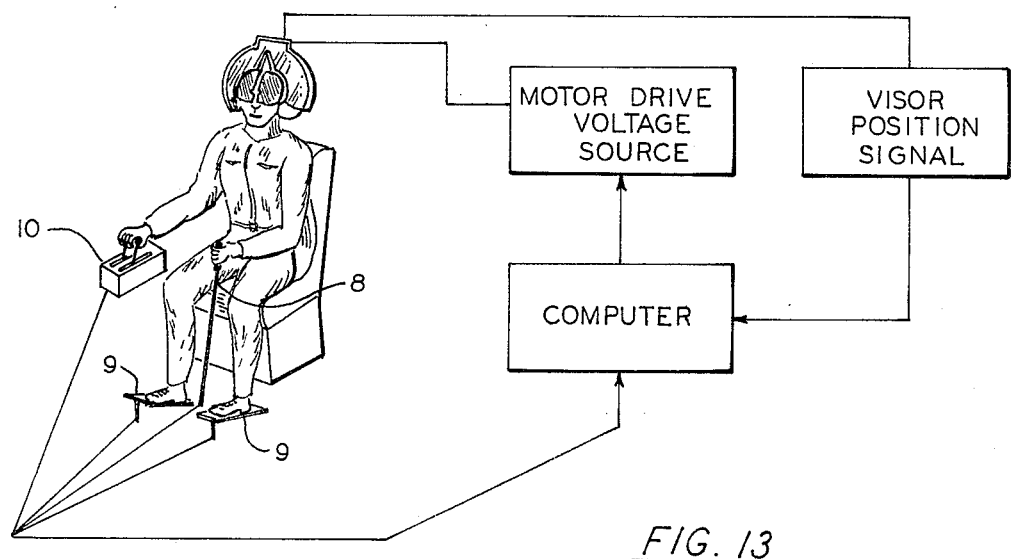
FIG. 13, similar to FIG. 4, shows the modified helmet used as a training device in a flight simulator.

When the helmet, as modified, is used in conjunction with an aircraft simulator training device, and the motor drive is susceptable to computer control, as indicated in FIG. 13, the reduction in pilot's peripheral vision can be made a function of the simulated flight acceleration loads as dictated by the computer in response to the pilot's manipulation of the simulator stick 8, rudder peddles 9 and throttle 10. Thus, if the "pilot" of the simulator maintains or increases the acceleration factors, his vision can be reduced to the point of blackout. As in actual flight under high-g stresses, as stated before, the "pilot" of the simulator learns to control his maneuvers by the degree of reduction in his peripheral vision. The modified helmet, by simulating tunnel vision and blackout, becomes a valuable element in pilot training.

While there have been described what is at present considered to be preferred embodiments of this invention, it will be obvious to those skilled in the art that various changes and modifications may be made therein without departing from the invention, and it is therefore intended to cover herein all such changes and modifications as fall within the true spirit and scope of the invention.

What is claimed is:
1. Apparatus for simulating the progressive degradation of vision experienced by a person undergoing acceleration stresses, said apparatus comprising:
  a. means for providing signals representative of selected acceleration forces;
  b. optical means for selectably controlling the area of clear optical transmission therethrough, and being sensitive to variable excitation for varying the size of said area of clear optical transmission;
  c. means responsive to said signals for providing said excitation to said optical means such that said area of clear light transmission therethrough is progressively decreased in response to first acceleration forces and progressively increased in response to second acceleration forces; and
  d. means for mounting said optical means with respect to said person such that said person experiences a change in his field of view as said area of clear optical transmission changes.

2. The apparatus of claim 1 wherein said optical means includes a layer of an optical medium contained between two outermost transparent layers such that said area of clear optical transmission varies in a regular, progressive manner in accordance with a gradient established across said optical medium layer such that said progression proceeds from selected regions of said layer toward other selected regions of said layer.

3. The apparatus of claim 2 whereby said gradient is established by controlling the variation in the thickness of the layer of said optical medium.

4. The apparatus of claim 2 wherein said gradient is established by controlling the variation in the thickness of the layer of said medium and said variable excitation is a variable voltage across said gradient.

5. The apparatus of claim 2 wherein said optical means is a visor fitted to a helmet worn by a person while said progressive degradation of vision is simulated.

6. The apparatus of claim 2 wherein said gradient established is a voltage gradient, said variable excitation being a variable voltage impressed across said optical medium by means of electrodes which consist of highly conductive segments in contact with highly resistive segments of the electrodes.

7. The apparatus of claim 2 wherein said gradient established is a voltage gradient, said variable excitation being a variable voltage impressed across said optical medium by transparent electrodes made up of discrete segments, said variable voltage being applied to said discrete electrode segments through a selection matrix which matrix is controlled to sequence the application of said voltage among said electrode segments.

8. The apparatus of claim 1 wherein said means for providing signals comprises:
  a trainee station having controls characteristic of a vehicle to be simulated; and
  means responsive to movement of said simulated vehicle controls for providing said signals.

9. The apparatus of claim 8 wherein said optical means is a visor fitted to a helmet worn during operation of the vehicle being simulated, said visor including a layer of an optical medium between two outermost transparent layers.

10. The apparatus of claim 8 wherein said optical means consists of a movable visor such that said area of clear optical transmission varies in a regular progressive manner in accordance with movement of said visor across said person's line of vision.

11. The apparatus of claim 1 wherein said means for providing signals comprises a trainee station having controls characteristic of a vehicle to be simulated; and
  computing means responsive to movement of said simulated vehicle controls and programmed with motion profile of the vehicle being simulated such that said selected acceleration forces represented by said signals are characteristic of the acceleration forces actually experienced by a vehicle of the type being simulated.

12. The apparatus of claim 11 wherein said optical means includes a layer of an optical medium contained between two outermost transparent layers such that the area of clear light transmission varies in a regular progressive manner in accordance with a gradient established across said optical medium layer whereby said progression proceeds from selected regions of said layer toward other selected regions of said layer.

13. The apparatus of claim 12 whereby said gradient is established by controlling the variation in the thickness of the layer of said optical medium.

14. The apparatus of claim 12 wherein said gradient is established by controlling the variation in thickness of the layer of said medium and said variable excitation is a variable voltage across said gradient.

15. The apparatus of claim 12 wherein said optical means is a visor fitted to a helmet worn during operation of the vehicle being simulated.

16. The apparatus of claim 12 wherein said gradient established is a voltage gradient in that the said variable excitation is a variable voltage impressed across said optical medium by means of electrodes which consist of highly conductive segments in contact with highly resistive segments said voltage being applied directly to the highly conductive segments of the electrodes.

17. The apparatus of claim 12 wherein said gradient established is a voltage gradient in that the said variable excitation is a variable voltage impressed across said optical medium by transparent electrodes made up of discrete segments, said variable voltage being applied to said discrete electrode segments through a selection matrix which matrix is controlled by said computing means to sequence the application of said voltage among said electrode segments.

18. The apparatus of claim 11 wherein said optical means consists of a movable visor such that said area of clear optical transmission varies in a regular progressive manner in accordance with movement of said visor across said person's line of vision.

19. The apparatus of claim 1 wherein said optical means consists of a movable visor such that said area of clear optical transmission varies in a regular progressive manner in accordance with movement of said visor across said person's line of vision.

20. Apparatus for causing the variation of the optical transmission characteristic of a variable optical medium to progress from selected areas of said variable optical medium toward other predetermined areas of said medium, said apparatus comprising:
 means for applying a variable excitation force to said variable optical medium; and
 means for establishing a gradient across said layer of said medium;
wherein the gradient established is a graded variation in the thickness of said variable optical medium layer such that upon application of the variable excitation the change in optical transmission characteristic progresses from the thicker to the thinner portions of said layer; and
 means for mounting said variable optical medium with respect to a person such that said person experiences a change in his field of view as the area of clear optical transmission of said variable optical medium varies in response to simulated acceleration forces.

21. Apparatus for achieving a progressive variation of the optical transmission characteristic of a variable optical medium, such that upon application of a variable excitation force said variation progresses from selected portions of said variable optical medium toward other, predetermined areas of said medium said apparatus comprising:
 voltage means for providing said variable excitation;
 first and second electrodes on either side of said optical medium, said electrodes consisting of highly conductive segments in contact with highly resistive segments; and
 means for impressing said variable voltage across said optical medium by applying said voltage directly to the highly conductive segments of the electrodes; and
 means for mounting said variable optical medium with respect to a person such that said person experiences a change in his field of view as the area of clear optical transmission of said variable optical medium varies in response to simulated acceleration forces.

22. A method of simulating the degradation of vision experienced by a person undergoing high acceleration forces which method comprises the steps of:
 providing signals representative of selected acceleration forces;
 supplying an optical device sensitive to variable excitation for selectively controlling light transmission;
 providing said excitation to said optical device such that an area of clear optical transmission is progressively diminished in response to first acceleration forces and progressively increased in response to second acceleration forces; and
 mounting said optical device with respect to said person such that said person experiences a change in his field of view as said area of clear optical transmission changes.

23. The method of claim 22 wherein the optical device consists of an optical medium constrained between two transparent retaining layers and comprising the further step of establishing a gradient across the layer of said optical medium, controlling said area of clear optical transmission in a graded, progressive manner.

24. The method of claim 23 wherein said gradient is established by providing a controlled variation in the thickness of said layer of said optical medium.

25. The method of claim 23 wherein said gradient is established by providing a controlled variation in thickness of the layer of said optical medium and a variable voltage provides said variable excitation.

26. The method of claim 23 further comprising the step of shaping the said two transparent retaining layers to substantially conform to the front and rear surface configuration of a visor fitted to a helmet worn while said progressive degradation of vision is simulated.

27. The method of claim 23 wherein said gradient is a voltage gradient and the method of establishing said voltage gradient comprises the steps of:
 providing a variable voltage as said variable excitation;
 providing, on either side of said optical medium, electrodes consisting of highly conductive segments in contact with highly resistive segments; and
 impressing said variable voltage across said optical medium by applying said voltage directly to the highly conductive segments of the electrodes.

28. The method of claim 23 wherein said gradient is a voltage gradient and the method of establishing said voltage gradient comprises the steps of:
 providing a variable voltage as said variable excitation;
 providing on either side of said optical medium electrodes made up of discrete segments;

impressing said variable voltage across said optical medium by applying said voltage to said discrete electrode segments through a selection matrix; and controlling said matrix to sequence the application of said voltage among said electrode segments.

29. The method of claim 22 wherein the optical device consists of an optical medium constrained between two transparent layers and comprising the further steps of simulating a selected vehicle with a trainee station having controls and instruments which station, controls and instruments are characteristic of the vehicle selected and deriving signals representative of selective acceleration forces in response to movement of said controls.

30. The method of claim 29 further comprising the step of shaping the two said transparent retaining layers to substantially conform to the front and rear surface configuration of a visor fitted to a helmet worn during operation of the vehicle being simulated.

31. The method of claim 22 wherein the optical device consists of an optical medium constrained between two transparent layers and comprising the further steps of:
  simulating a selected vehicle with a trainee station having controls and instruments, which station, controls and instruments are characteristic of the vehicle selected;
  generating signals representative of the movement of said controls;
  providing a computer responsive to said generated signals and which computer has been programmed with the motion profile of the said selected vehicle; and
  deriving said signals representative of selected acceleration forces from the output of said computer such that said signals derived are characteristic of the acceleration forces actually experienced by a vehicle of the type being simulated.

32. The method of claim 31 further comprising the step of establishing a gradient across said layer of said optical medium controlling said area of clear optical transmission in a graded, progressive manner.

33. The method of claim 32 wherein said gradient is established by providing a controlled variation in thickness of said layer of said optical medium.

34. The method of claim 32 wherein said gradient is established by providng a controlled variation in thickness of said layer of said optical medium and a variable voltage provides said variable excitation.

35. The method of claim 31 further comprising the step of shaping the said two transparent retaining layers to substantially conform to the front and rear surface configuration of a visor fitted to a helmet worn during operation of the vehicle being simulated.

36. The method of claim 31 wherein said gradient is a voltage gradient and the method of establishing said voltage gradient comprises the steps of:
  providing a variable voltage as said variable excitation;
  providing, on either side of said optical medium, electrodes consisting of highly conductive segments in contact with highly resistive segments; and
  impressing said variable voltage across said optical medium by applying said voltage directly to the highly conductive segments of the electrodes.

37. The method of claim 31 wherein said gradient is a voltage gradient and the method of establishing said voltage gradient comprises the steps of:
  providing a variable voltage as said variable excitation;
  providing on either side of said optical medium electrodes made up of discrete segments;
  impressing said variable voltage across said optical medium by applying said voltage to said discrete electrode segments through a selection matrix; and
  controlling said matrix to sequence the application of said voltage among said electrode segments.

38. The method of claim 22 wherein said optical device consists of two visors movably coupled to a servo drive motor which motor, in response to said variable excitation, drives said visors to affect the area of clear optical transmission in accordance with the movement of said visors across said person's line of vision.

39. The method of claim 38 comprising the further steps of simulating a selected vehicle with a trainee station having controls and instruments which station, controls and instruments are characteristic of the vehicle selected and deriving signals representative of selective acceleration forces in response to movement of said controls.

40. The method of claim 38 comprising the further steps of simulating a selected vehicle with a trainee station having controls and instruments, which station, controls and instruments are characteristic of the vehicle selected; generating signals representative of the movement of said controls; providing a computer responsive to said generated signals and which computer has been programmed with the motion profile of the said selected vehicle; and deriving said signals representative of selected acceleration forces from the output of said computer such that said signals derived are characteristic of the acceleration forces actually experienced by a vehicle of the type being simulated.

41. The method for achieving a progressive variation of the optical transmission characteristic of a variable optical medium such that said variation progresses from selected portions of said variable optical medium toward other predetermined areas of said medium said method comprising the steps of:
  applying a variable excitation force to said variable optical medium;
  establishing a gradient across said layer of said medium; wherein the gradient established is a graded variation in the thickness of said variable optical medium layer such that upon application of the variable excitation the change in optical transmission characteristic progress from the thicker to the thinner portions of said layer; and
  mounting said variable optical medium with respect to a person such that said person experiences a change in his field of view as the area of clear optical transmission of said variable optical medium varies in response to simulated acceleration forces.

42. A method for achieving a progressive variation of the optical transmission characteristic of a variable optical medium such that upon application of a variable excitation force said variation progresses from selected portions of said variable optical medium toward other, predetermined areas of said medium said method comprising the steps of:
  providing a variable voltage as said variable excitation;

providing on either side of said optical medium electrodes made up of discrete segments;
impressing said variable voltage across said optical medium by applying said voltage to said discrete electrode segments through a selection matrix;
controlling said matrix to sequence the application of said voltage among said electrode segments; and
mounting said variable optical medium with respect to a person such that said person experiences a change in his field of view as the area of clear optical transmission of said variable optical medium varies in response to simulated acceleration forces.

* * * * *